United States Patent
Dubal et al.

(10) Patent No.: US 7,246,038 B2
(45) Date of Patent: Jul. 17, 2007

(54) METHOD, SYSTEM, AND ARTICLE OF MANUFACTURE FOR RUNNING DIAGNOSTICS RELATED TO A DEVICE

(75) Inventors: Scott P. Dubal, Hillsboro, OR (US); Patrick L. Connor, Portland, OR (US); Mark V. Montecalvo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/351,684

(22) Filed: Feb. 10, 2006

(65) Prior Publication Data

US 2006/0129354 A1 Jun. 15, 2006

Related U.S. Application Data

(63) Continuation of application No. 10/742,218, filed on Dec. 19, 2003, now Pat. No. 7,031,881.

(51) Int. Cl.
*G06F 11/30* (2006.01)
*G06F 19/00* (2006.01)

(52) U.S. Cl. .................... 702/183; 702/123; 714/25

(58) Field of Classification Search ............ 702/108, 702/117–120, 122, 123, 182–186; 324/500, 324/512; 714/25, 47
See application file for complete search history.

(56) References Cited

U.S. PATENT DOCUMENTS

| 7,031,881 B2* | 4/2006 | Dubal et al. ............ 702/183 |
| 2002/0083113 A1* | 6/2002 | Natu ..................... 709/100 |
| 2003/0093743 A1* | 5/2003 | Berry et al. ............ 714/758 |
| 2003/0125908 A1* | 7/2003 | Wynn et al. ............ 702/186 |

* cited by examiner

*Primary Examiner*—Manuel L. Barbee
(74) *Attorney, Agent, or Firm*—Konrad Raynes & Victor LLP; Rabindranath Dutta (57) ABSTRACT

Provided are a method, system, and article of manufacture, wherein in certain embodiments, an indicator is searched for in a computational platform, and wherein the indicator indicates an operational state of a device coupled to the computational platform. A determination is made that the indicator has been modified to disable the device. The indicator is modified to allow enablement of the disabled device. The device is tested to determine whether the device is capable of operating correctly.

16 Claims, 6 Drawing Sheets

METHOD, SYSTEM, AND ARTICLE OF MANUFACTURE FOR RUNNING DIAGNOSTICS RELATED TO A DEVICE

CROSS-REFERENCE TO RELATED APPLICATIONS

This application is a continuation of application Ser. No. 10/742,218 filed on Dec. 19, 2003 now U.S. Pat. No. 7,031,881, which is incorporated herein by reference in its entirety.

BACKGROUND

1. Field

The disclosure relates to a method, apparatus, system, and article of manufacture for running diagnostics related to a device.

2. Background

A computational platform may have various devices coupled to the computational platform. Such devices may include network adapters, video adapters, modems, printers, etc. The computational platform may also include device drivers corresponding to the devices that are coupled to the computational platform, where the device drivers are software interfaces that allow the features of the devices to be exploited by an operating system that executes in the computational platform.

Certain operating systems, such as, certain versions of the Microsoft Windows* operating system, may include a plug and play manager, where the plug and play manager may automatically configure the devices that are coupled to the computational platform. If the computational platform includes an operating system with a plug and play manager, then a user of the computational platform may not have to set switches, jumpers, and other configuration elements of the computational platform when a plug and play device is coupled to the computational platform.

*Microsoft Windows, Windows 2000, Windows XP are trademarks of Microsoft Corp.

The plug and play manager or some other application associated with the operating system may disable a device with respect to an operating system, in response to determining that the device is unusable by the operating system. For example, the plug and play manager may disable the device with respect to the operating system if the proper device driver for the device does not exist or is unavailable. The plug and play manager may also disable the device with respect to the operating system if a user has manually disabled the device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
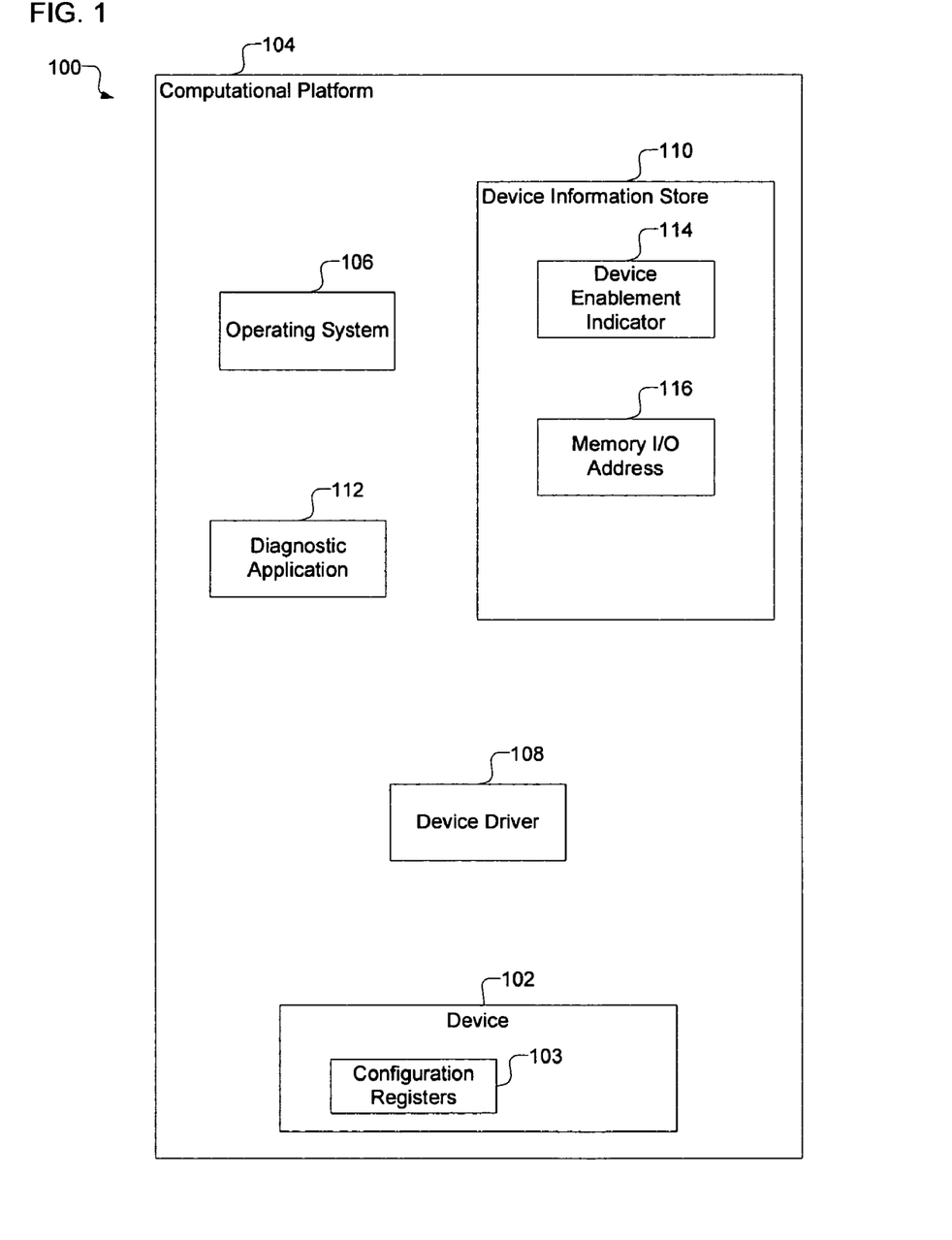
FIG. 1 illustrates a first computing environment in which certain embodiments may be implemented.

FIG. 1 illustrates a computing environment 100 in which certain embodiments are implemented. A device 102 is coupled to a computational platform 104. While in the computing environment 100 the device 102 is shown internal to the computational platform 104, in alternative embodiments the device 102 may be external to the computational platform 104. The device 102 may include a hardware device, such as, a network adapter, an I/O controller, a storage device, a modem, a video adapter, etc., where the hardware device is capable of interfacing with the computational platform 104. While a single device 102 is shown coupled to the computational platform 104, in certain alternative embodiments a plurality of devices may be coupled to the computational platform 104. The device 102 may include configuration registers 103, where in certain embodiments in which the device 102 is a peripheral component interconnect (PCI) device the configuration registers 103 may be PCI configuration registers. The computational platform 104 may be a computing device, such as, a personal computer, a workstation, a server, a mainframe, a hand held computer, a palm top computer, a telephony device, a network appliance, a blade computer, etc.

The computational platform 104 may include an operating system 106, a device driver 108, a device information store 110, and a diagnostic application 112. The computational platform 104 may also include additional applications (not shown) that call the operating system 106 to perform operations with respect to the device 102.

The operating system 106 may include certain versions of the Microsoft Windows Operating System, such as Windows 2000*, Windows XP*, etc. Other operating systems, such as, versions of the UNIX* operating system may also be used in certain embodiments.

*Microsoft Windows, Windows 2000, Windows XP are trademarks of Microsoft Corp.
*UNIX is a trademark of the Open Group.

The device driver 108 may be a program that controls the device 102. The device driver 108 may act like a translator between the hardware device 102 and the operating system 106. The device driver 108 may accept commands from the operating system 106 and translate the accepted commands into specialized commands for the device 102. In certain embodiments, in which the device 102 is a network adapter, the device driver 108 may be a driver for the network adapter.

The device information store 110 may be implemented as a static and/or dynamic data storage structure, where the data storage structure may be one or more files, one or more directories including one or more files, programming language variables, pointers, etc. The device information store 110 may include information related to the device 102. In certain embodiments, the device information store 110 may be associated with a device enablement indicator 114 and a memory Input/Output (I/O) address 116. The device enablement indicator 114 may indicate whether the device 102 is enabled or disabled. The memory I/O address 116 is an address in the memory (not shown) of the computational platform 104, to which the device 102 is memory mapped. In certain embodiments, the device information store 110 may include information related to a plurality of devices, whereas in other embodiments a plurality of device information stores may include information related to a plurality of devices.

The diagnostic application 112 corresponds to the device 102, and in certain embodiments may be installed in the computational platform 104 when the device 102 is coupled to the computational platform 104. In certain embodiments, the diagnostic application 112 is distributed with the device 102. If the diagnostic application 112 is distributed in a storage media, such as, a floppy diskette or a CDROM, then the diagnostic application 112 may be installed in the computational platform 104 from the storage media.

The diagnostic application 112 is capable of determining whether the device enablement indicator 114 corresponding to the device 102 indicates the device 102 to be disabled or enabled. If the diagnostic application 112 determines that the device enablement indicator 114 corresponding to the device 102 indicates that the device 102 is disabled, then the diagnostic application 112 can modify the device enablement indicator 114 to indicate that the device 102 is enabled. Subsequently, the device 102 may be loaded into the memory I/O address 116 and the diagnostic application 112 may test the device 102 to determine whether there is any hardware error in the device 102 that may have caused the device 102 to be disabled by the operating system 106.

FIG. 1 illustrates an embodiment in which the diagnostic application 112 determines whether the device enablement indicator 114 indicates the device 102 to be disabled. In response to determining that the device enablement indicator 114 indicates the device 102 to be disabled, the diagnostic application 112 modifies the device enablement indicator 114 to indicate that the device 102 is enabled. The device 102 is loaded into the memory I/O address 116 and the diagnostic application 112 may run diagnostic tests on the device 102 to determine whether there are any errors in the device 102. In certain alternative embodiments, the diagnostic tests may be run by an application (not shown) that is different from the diagnostic application 112.

Figure 2:
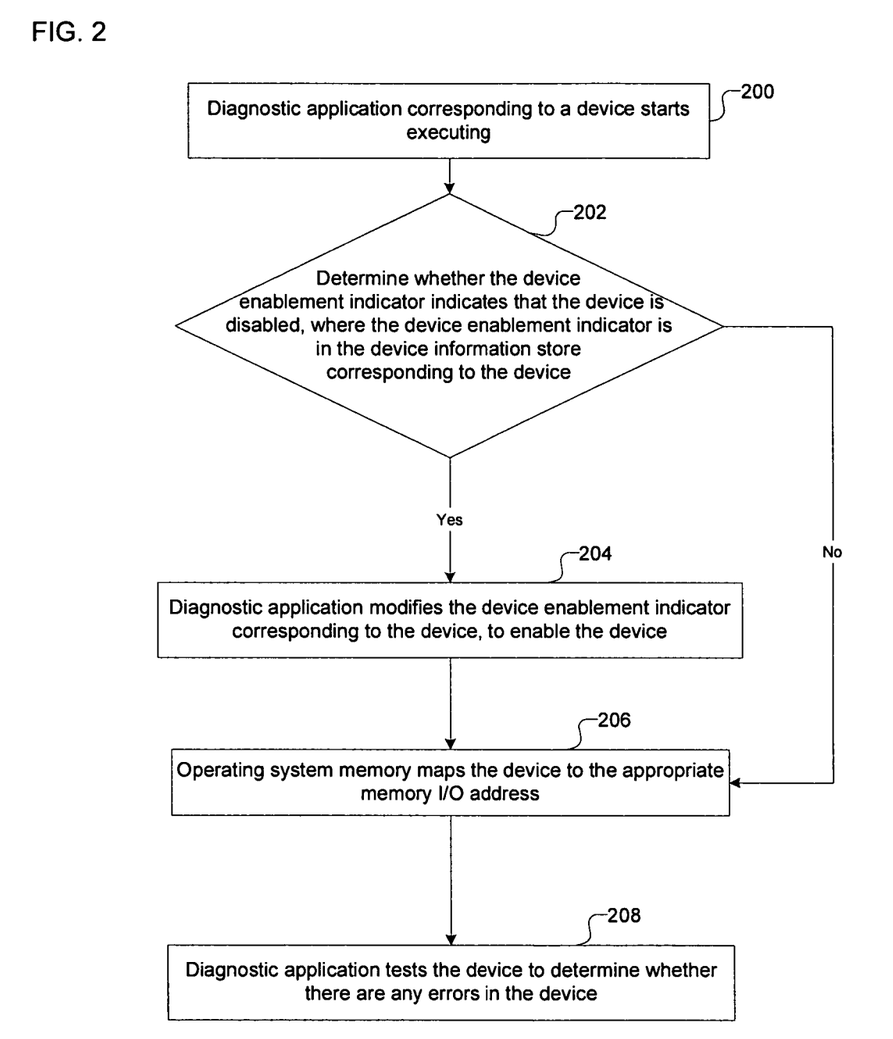
FIG. 2 illustrates operations for running diagnostics related to a device, wherein the operations are described with respect to the first computing environment.

FIG. 2 illustrates operations for running diagnostics related to the device 102, wherein the operations are described with respect to the first computing environment 100 of FIG. 1. In certain embodiments, the operations may be implemented in the diagnostic application 112. In certain embodiments, the diagnostic application 112 may be started manually by a user when the user determines that the device 102 is not being recognized by the operating system 106.

Control starts at block 200, where the diagnostic application 112 corresponding to the device 102 starts executing. The diagnostic application 112 determines (at block 202) whether the device enablement indicator 114 indicates that the device 102 is disabled, where the device enablement indicator 114 is stored in the device information store 110 corresponding to the device 102.

If the diagnostic application 112 determines (at block 202) that the device enablement indicator 114 indicates that the device 102 is disabled, then the diagnostic application 112 modifies (at block 204) the device enablement indicator 114 to enable the device 102.

The operating system 106 maps (at block 206) the device 102 to the memory I/O address 116. The diagnostic application 112 tests (at block 208) the device 102 to determine whether there are any errors in the device 102.

If the diagnostic application 112 determines (at block 202) that the device enablement indicator 114 indicates that the device 102 is enabled, then the operating system 106 maps (at block 206) the device 102 to the memory I/O address 116 and the diagnostic application 112 tests (at block 208) the device 102 to determine if there are any errors in the device 102. Testing the device 102 may include accessing configuration registers 103 in the device 102, running diagnostics on the configuration registers, and determining that the device 102 is capable of operating correctly if the diagnostics on the configuration registers run successfully.

FIG. 2 illustrates an embodiment in which the diagnostic application 112 enables a disabled device and runs diagnostic tests on the enabled device to determine whether there are any errors in the enabled device.

Figure 3:
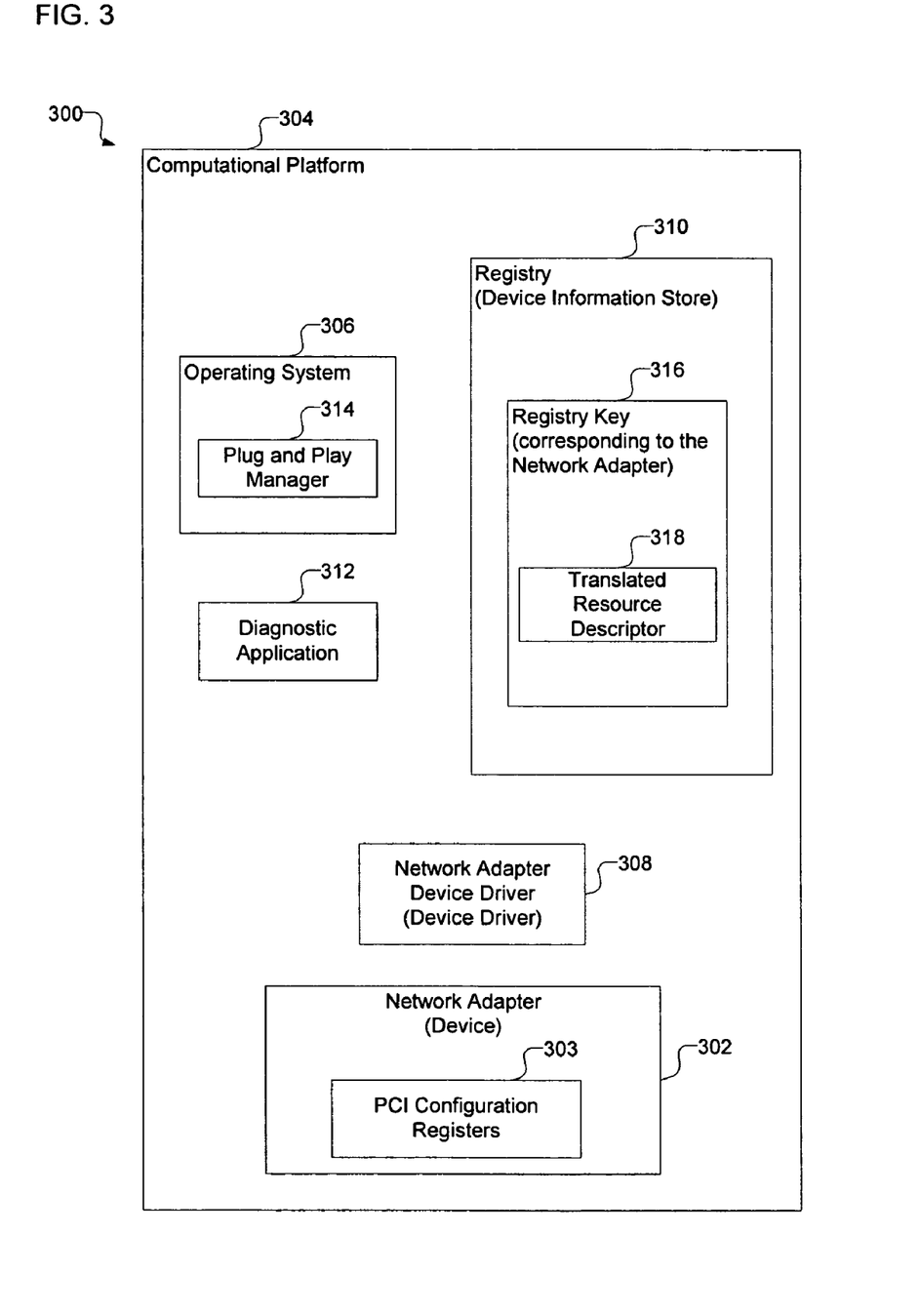
FIG. 3 illustrates a second computing environment that includes a network adapter, wherein certain embodiments may be implemented in the second computing environment.

FIG. 3 illustrates a second computing environment 300 that includes a network adapter 302 coupled to a computational platform 304, in accordance with certain embodiments. In certain embodiments the network adapter 302 that is included in the computational platform 304 corresponds to the device 102 that is included in the computational platform 104. In certain embodiments, the network adapter 302 may be a Peripheral Component Interconnect (PCI) device and include PCI configuration registers 303.

In addition to the network adapter 302, the computational platform 304 may include an operating system 306, a network adapter device driver 308, a registry 310, and a diagnostic application 312.

The operating system 306 may be a version of the Microsoft Windows Operating System with a plug and play manager 314. The plug and play manager 314 allows the network adapter 302 to be coupled to the computational platform 304 without requiring any manual configuration of switches, jumpers, etc., in the computational platform 304.

The computational platform 104 may include a network adapter device driver 308, where the network adapter device driver 308 provides a software interface that allows the operating system 306 to exploit the features of the network adapter 302.

The registry 310 included in the computational platform 304 may correspond to the device information store 110 included in the computational platform 104. In certain embodiments, in which the operating system 306 includes certain versions of the Microsoft Windows operating system with the plug and play manager 314, the registry 310 may include a registry key 316 corresponding to the network adapter 302. A translated resource descriptor 318 that corresponds to the network adapter 302 may also be associated with the registry key 316. The translated resource descriptor 318 may include the PCI configuration information that a PCI enumerator (not shown) of the operating system 306 may generate for each plug and play device found by the PCI enumerator. All devices, such as, the network adapter 302, irrespective of whether the devices are disabled or enabled may have a translated resource descriptor 318 stored in the registry 310, unless the device has to be explicitly uninstalled. The plug and play manager 314 may store the translated resource descriptors 318 for all devices coupled to the computational platform 304 in the registry 310.

FIG. 3 illustrates certain embodiments, in which the diagnostic application 312 uses the registry key 316 to enable a disabled network adapter 302, where the operating system 306 does not remove the translated resource descriptor 318 corresponding to the network adapter 302 when the network adapter 302 is disabled. Subsequently, the diagnostic application tests the network adapter 302 for errors. In certain embodiments, the diagnostic application 312 may take advantage of the fact that if the network adapter device driver 308 has the raw BIOS-assigned PCI configuration information of the network adapter 302, then the network adapter device driver 308 can match a unique resource, such as, the memory address at Base Address Register (BAR) 0 from the raw BIOS-assigned PCI configuration data against the memory address at BAR 0 from the translated PCI configuration information found in the translated resource descriptor 318 corresponding to the network adapter 302. The diagnostic application 312 therefore has a way to map the network adapter 302 into memory and access a PCI configuration space of the network adapter 302. There is no need for the diagnostic application 312 to read and/or write to the configuration registers 303 of the network adapter 302 to diagnose problems in the network adapter 302.

Figure 4:
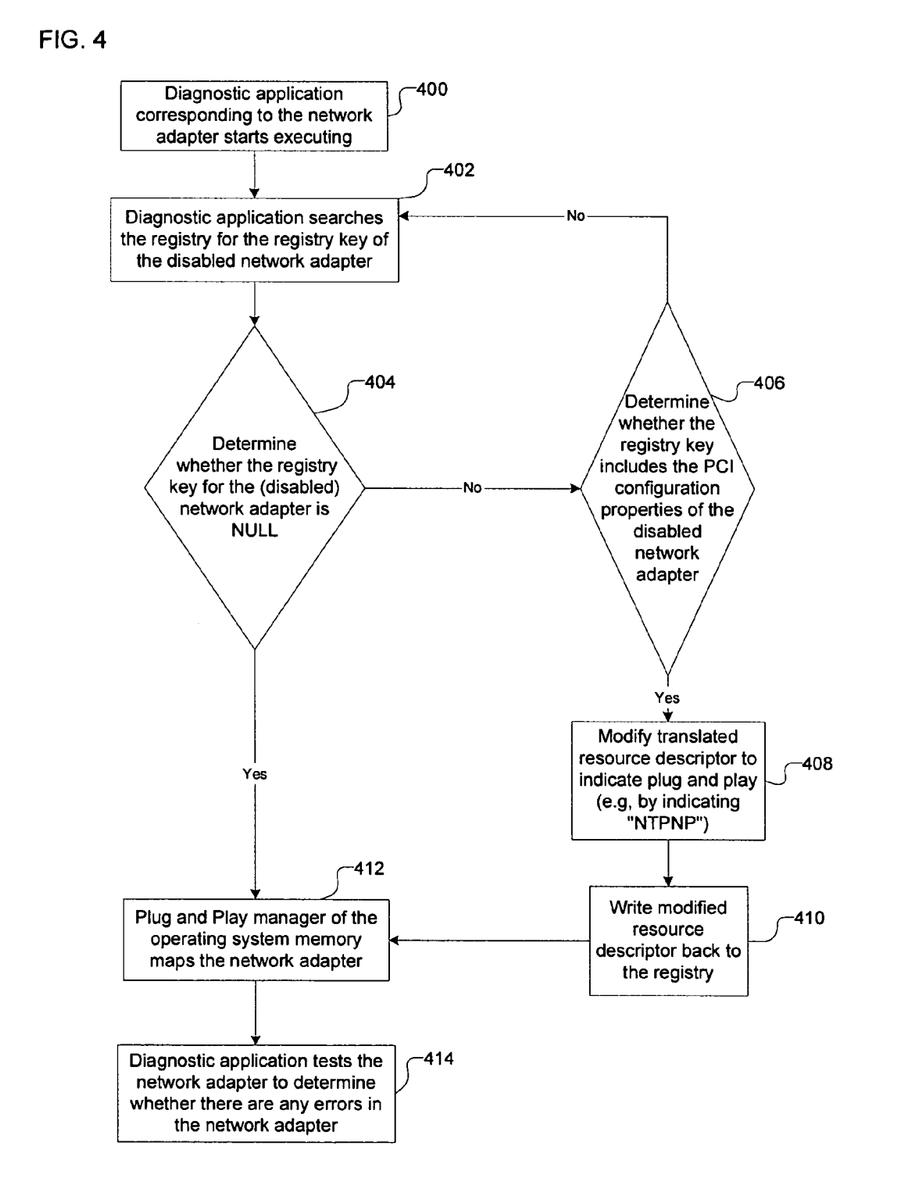
FIG. 4 illustrates operations for running diagnostics related to the network adapter, wherein the operations are described with respect to the second computing environment.

FIG. 4 illustrates operations executed by the diagnostic application 312, wherein the operations are described with respect to the computing environment 300.

Control starts at block 400, where the diagnostic application 312 corresponding to the network adapter 302 starts executing. The diagnostic application 312 searches (at block 402) the registry 310 for the registry key 316 corresponding to the disabled network adapter 302.

The diagnostic application 312 determines (at block 404) whether the registry key 316 corresponding to the disabled network adapter 302 is NULL. If not, the diagnostic application 312 determines (at block 406) whether the registry key 316 includes the PCI configuration properties of the disabled network adapter 302. If the diagnostic application 312 determines (at block 312) that the registry key 316 includes the PCI configuration properties of the disabled network adapter 302, then the diagnostic application 312 modifies (at block 408) the translated resource descriptor 318 to indicate that the network adapter is a plug and play device. In certain embodiments in which the operating system 306 is a version of the Microsoft Windows Operating System, the translated resource indicator may be modified to include the field "NTPNP," where the field "NTPNP" corresponds to Windows NT Plug-and-Play.

The diagnostic application 312 writes (at block 410) the modified resource descriptor back to the registry 310. The plug and play manager 312 of the operating system 316 memory maps the network adapter 302. The diagnostic application 312 tests (at block 414) the network adapter 302 to determine whether there are any errors in the network adapter 302.

If the diagnostic application 312 determines (at block 404) that the registry key 316 for the disabled adapter 302 is null, then the plug and play manager 314 memory maps (at block 412) the network adapter 302 and the diagnostic application 312 runs (at block 414) diagnostic tests on the network adapter 302 to determine errors in the network adapter 302.

If the diagnostic application 312 determines (at block 406) that the registry key 316 does not include the PCI configuration properties of the disabled network adapter 302 then the diagnostic application 112 may in certain embodiments continue searching (at block 402) the registry 310.

FIG. 4 illustrates an embodiment in which the diagnostic application 312 determines from the registry 310 whether a network adapter 302 or any other device has been disabled by the operating system 306. The diagnostic application 312 may modify the translated resource descriptor 318 corresponding to the disabled network adapter 302 to indicate that the network adapter 302 is a plug and play device. The plug and play manager 314 maps the network adapter 302 into memory and the diagnostic application 312 runs diagnostic tests on the network adapter 302.

Figure 5:
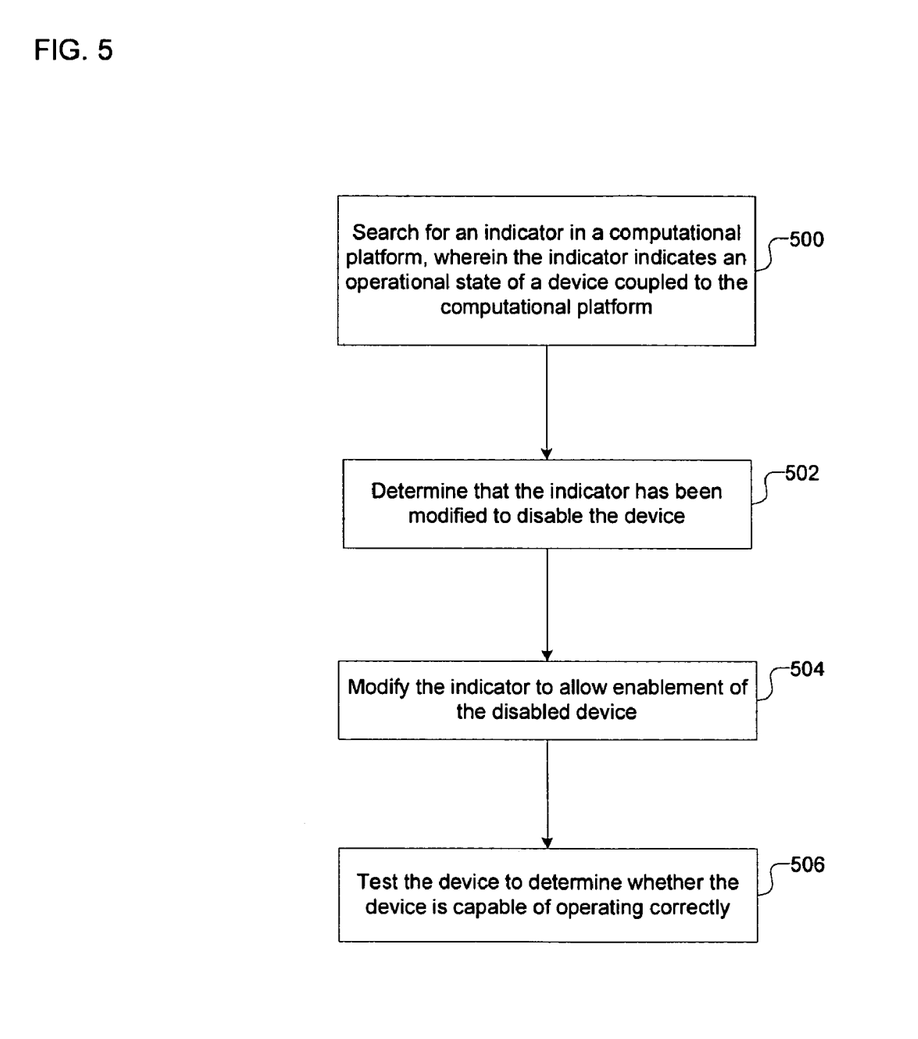
FIG. 5 illustrates operations, wherein the operations are described with respect to the first computing environment.

FIG. 5 illustrates operations, wherein the operations are described with respect to the computing environment 100.

Control starts at block 500, wherein the indicator 114 is searched for in the computational platform 104, wherein the indicator 114 indicates an operational state of the device 102 coupled to the computational platform 104. A determination (at block 502) is made that the indicator 114 has been modified to disable the device 102. The indicator 114 is modified to allow enablement of the disabled device 102. The device 102 is tested to determine whether the device 102 is capable of operating correctly.

Certain embodiments allow a diagnostic application, such as, diagnostic applications 112, 312, to determine whether there is any error in a device that is coupled to a computational platform. In certain embodiments, users may run the diagnostic application when a device coupled to a computational platform does not appear to operate in association with the computational platform. If the diagnostic application determines that there is an error in the device then the device may need to be replaced. If the diagnostic application determines that there is no error in the device, then the cause of the malfunctioning of the device may lie outside of the device.

When an operating system disables a device coupled to a computational platform, certain embodiments allow the diagnostic application to enable the device and test the device to determine whether there is any error in the device. Users of the computational platform may not need to unnecessarily report problems with the device to the manufacturer of the device.

In certain embodiments, there is no requirement on the part of the diagnostic application that the device driver corresponding to a device be loaded before the diagnostic application can run. The diagnostic application can enable a device if the device is disabled and then the device driver of the device is loaded and the diagnostic application can test the device for errors.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art.

Figure 6:
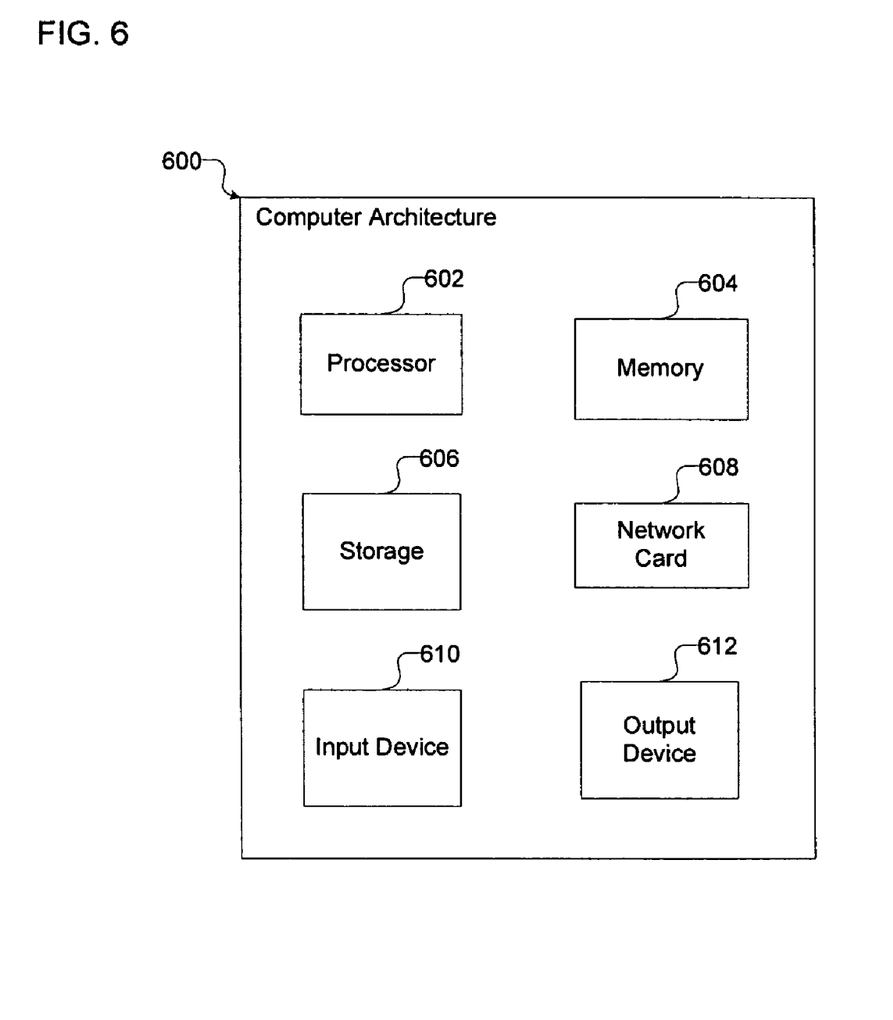
FIG. 6 illustrates a computer architecture in which certain described embodiments are implemented.

FIG. 6 illustrates a block diagram of a computer architecture in which certain embodiments are implemented. FIG. 6 illustrates one embodiment of the computational platforms 104, 304. The computational platforms 104, 304 may implement a computer architecture 600 having a processor 602, a memory 604 (e.g., a volatile memory device), and storage 606. Not all elements of the computer architecture 600 may be found in the computational platforms 104, 304. The storage 606 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 606 may comprise an internal storage device, an attached storage device and/or a network accessible storage device. Programs in the storage 606 may be loaded into the memory 604 and executed by the processor 602 in a manner known in the art. The architecture may further include a network card 608 to enable communication with a network. The architecture may also include at least one input device 610, such as a keyboard, a touchscreen, a pen, voice-activated input, etc., and at least one output device 612, such as a display device, a speaker, a printer, etc.

In certain embodiments, the device 102, such as, the network adapter 302, may be included in a computer system including any storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. In alternative embodiments, the device 102 may be included in a system that does not include a storage controller, such as certain hubs and switches.

Certain embodiments may be implemented in a computer system including a video controller to render information to display on a monitor coupled to the computer system including the device 102, such as, the network adapter 302, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

At least certain of the operations of FIGS. 2, 4, and 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components. In certain embodiments the network adapter may be a specialized part of the central processing unit of the computational platform.

The data structures and components shown or referred to in FIGS. 1–6 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    searching for an indicator in a computational platform, wherein the indicator indicates an operational state of a device coupled to the computational platform;
    loading the device into a memory address;
    determining whether an error in the device caused an operating system to modify the indicator to disable the device;
    modifying the indicator to allow enablement of the device, in response to the indicator having been modified to disable the device; and
    testing the device to determine whether the device is capable of operating correctly.

2. The method of claim 1, wherein the searching and the modifying are performed by a diagnostic application associated with the device, the method further comprising:
    starting the diagnostic application, in response to determining that the device is not being recognized by an operating system running on the computational platform; and
    indicating that the device needs to be replaced, in response to determining that the device is not capable of operating correctly.

3. The method of claim 2, further comprising:
    installing the diagnostic application in the computational platform in response to coupling the device to the computational platform.

4. The method of claim 1, wherein testing the device to determine whether the device is capable of operating correctly further comprises:
    accessing configuration registers in the device;
    running diagnostics on the configuration registers; and
    determining that the device is capable of operating correctly if the diagnostics on the configuration registers run successfully, wherein the accessing, the running and the determining are performed by a diagnostic application associated with the device, and wherein the diagnostic application is stored in the computational platform.

5. A system, capable of communicating with a device, the system comprising:
    a computational platform, capable of interacting with the device, in response to an addition of the device to the computational platform; and
    a processing element included in the computational platform, wherein the processing element is capable of performing:
        (i) searching for an indicator in the computational platform, wherein the indicator is capable of indicating an operational state of the device;
        (ii) loading the device into a memory address;
        (iii) determining whether an error in the device caused an operating system to modify the indicator to disable the device;
        (iv) modifying the indicator to allow enablement of the device, in response to the indicator having been modified to disable the device; and
        (v) testing the device to determine whether the device is capable of operating correctly.

6. The system of claim 5, wherein the searching and the modifying are performed by a diagnostic application associated with the device, wherein the processing element is further capable of performing:

starting the diagnostic application, in response to determining that the device is not being recognized by an operating system running on the computational platform; and indicating that the device needs to be replaced, in response to determining that the device is not capable of operating correctly.

7. The system of claim 6, wherein the processing element is further capable of performing:

installing the diagnostic application in the computational platform in response to coupling the device to the computational platform.

8. The system of claim 5, further comprising:

configuration registers associated with the device, wherein testing the device to determine whether the device is capable of operating correctly further comprises:
 (i) accessing the configuration registers in the device;
 (ii) running diagnostics on the configuration registers; and
 (iii) determining that the device is capable of operating correctly if the diagnostics on the configuration registers run successfully, wherein the accessing, the running and the determining are performed by a diagnostic application associated with the device, and wherein the diagnostic application is stored in the computational platform.

9. A computer readable storage medium having stored therein instructions that when executed by a computational platform are capable of causing operations, the operations comprising:

searching for an indicator in the computational platform, wherein the indicator indicates an operational state of a device coupled to the computational platform;

loading the device into a memory address;

determining whether an error in the device caused an operating system to modify the indicator to disable the device;

modifying the indicator to allow enablement of the device, in response to the indicator having been modified to disable the device; and testing the device to determine whether the device is capable of operating correctly.

10. The computer readable storage medium of claim 9, wherein the searching and the modifying are performed by a diagnostic application associated with the device, the operations further comprising:

starting the diagnostic application, in response to determining that the device is not being recognized by an operating system running on the computational platform; and indicating that the device needs to be replaced, in response to determining that the device is not capable of operating correctly.

11. The computer readable storage medium of claim 10, the operations further comprising:

installing the diagnostic application in the computational platform in response to coupling the device to the computational platform.

12. The computer readable storage medium of claim 9, wherein testing the device to determine whether the device is capable of operating correctly further comprises:

accessing configuration registers in the device;
running diagnostics on the configuration registers;
determining that the device is capable of operating correctly if the diagnostics on the configuration registers run successfully, wherein the accessing, the running and the determining are performed by a diagnostic application associated with the device, and wherein the diagnostic application is stored in the computational platform.

13. A system capable of communicating with a device, the system comprising:

a computational platform capable of interacting with the device, in response to an addition of the device to the computational platform;

a video controller implemented in the computational platform, wherein the video controller is capable of rendering information; and a processing element included in the computational platform, wherein the processing element is capable of performing:
 (i) searching for an indicator in the computational platform, wherein the indicator is capable of indicating an operational state of the device;
 (ii) loading the device into a memory address;
 (iii) determining whether an error in the device caused an operating system to modify the indicator to disable the device;
 (iv) modifying the indicator to allow enablement of the device, in response to the indicator having been modified to disable the device; and
 (v) testing the device to determine whether the device is capable of operating correctly.

14. The system of claim 13, wherein the searching and the modifying are performed by a diagnostic application associated with the device, wherein the processing element is further capable of performing:

starting the diagnostic application, in response to determining that the device is not being recognized by an operating system running on the computational platform; and indicating that the device needs to be replaced, in response to determining that the device is not capable of operating correctly.

15. The system of claim 14, wherein the processing element is further capable of performing:

installing the diagnostic application in the computational platform in response to coupling the device to the computational platform.

16. The system of claim 13, further comprising:

configuration registers associated with the device, wherein testing the device to determine whether the device is capable of operating correctly further comprises:
 (i) accessing the configuration registers in the device;
 (ii) running diagnostics on the configuration registers; and
 (iii) determining that the device is capable of operating correctly if the diagnostics on the configuration registers run successfully, wherein the accessing, the running and the determining are performed by a diagnostic application associated with the device, and wherein the diagnostic application is stored in the computational platform.

* * * * *